United States Patent [19]

Beuschel et al.

[11] Patent Number: 5,708,113
[45] Date of Patent: Jan. 13, 1998

[54] CATALYST FOR THE PREPARATION AND PROCESSING OF POLYORGANOSILOXANES

[75] Inventors: Günter Beuschel; Holger Rautschek, both of Nünchritz; Gisela Liesch, Riesa, all of Germany

[73] Assignee: Huels Silicone GmbH, Nuenchritz, Germany

[21] Appl. No.: 765,458

[22] PCT Filed: Jul. 14, 1995

[86] PCT No.: PCT/EP95/02761

§ 371 Date: Jan. 23, 1997

§ 102(e) Date: Jan. 23, 1997

[87] PCT Pub. No.: WO96/03455

PCT Pub. Date: Feb. 8, 1996

[30] Foreign Application Priority Data

Jul. 23, 1994 [DE] Germany ............... 44 26 213.2

[51] Int. Cl.$^6$ ............... C08G 77/06; C07F 7/08

[52] U.S. Cl. ............... 528/15; 502/102; 502/152; 502/158; 528/16; 528/17; 556/9; 556/10; 556/11; 556/12

[58] Field of Search ............... 502/102, 158, 502/152; 528/16, 17, 15; 556/9, 10, 11, 12

[56] References Cited

U.S. PATENT DOCUMENTS

| | | | |
|---|---|---|---|
| 3,419,593 | 12/1968 | Willing | 528/15 |
| 3,927,052 | 12/1975 | Vizurraga | 502/158 |
| 4,681,963 | 7/1987 | Lewis | 528/15 |
| 5,304,622 | 4/1994 | Ikai et al. | 528/17 |

*Primary Examiner*—Melvyn I. Marquis
*Attorney, Agent, or Firm*—Oblon, Spivak, McClelland, Maier & Neustadt, P.C.

[57] ABSTRACT

The invention relates to catalysts for the preparation and processing of polyorganosiloxanes, in particular for processing silicone resins, for example for solvent-free production of mica insulating materials. The catalysts are silanized organometallic compounds.

17 Claims, No Drawings

CATALYST FOR THE PREPARATION AND PROCESSING OF POLYORGANOSILOXANES

TECHNICAL FIELD

The invention relates to catalysts for the preparation and processing of polyorganosiloxanes, in particular for the processing of silicone resins, for example for solvent-free preparation of mica insulating materials. The catalysts are silanized organometallic compounds and have a high catalytic activity. Another field of use of the silanized organometallic compounds is acceleration of the curing of silicone rubbers and silicone resins which crosslink by condensation, in particular when used in the form of aqueous formulations.

PRIOR ART

Organosilicon compounds, in particular polyorganosiloxanes, have found a wide field of use because of their specific physical properties. Their use extends from elastic sealing compositions to the production of components for the electrical industry, where particularly high requirements are imposed on the properties of the processed polyorganosiloxanes, such as, for example, in the use of silicone resins as binders in mica insulating materials.

The Patent DE 11 26 467 discloses the principles for the production of insulating materials based on mica using solvent-containing silicone resins or aqueous suspensions. The production of mica insulating materials, preferably with solvent-containing silicone resins with the addition of catalysts, is known. Solutions of aminic, organophosphorus or organometallic compounds are employed as catalysts. Extensive literature references are given in Noll, Chemie u. Technologie der Silicone (Chemistry and Technology of the Silicones) (Noll, Chemie u. Technologie der Silicone, 2nd edition, Weinheim 1968, page 357).

The technology based on an organic solvent was expensive in terms of safety and was displaced by further development in favour of aqueous systems. For this, aqueous suspensions of mica slurry, silicone resin powder, emulsifiers and catalysts are processed to prepregs, and rigid mica insulating materials with silicone resin binders are obtained by subsequent compression moulding.

Pure or mixed, pulverulent or pasty organometallic compounds, such as, for example, the acetylacetonates of aluminium and zinc and reaction products thereof, are preferably used as catalysts for aqueous systems. Although these are largely insoluble, they essentially dissolve in the aqueous suspensions at the low use concentrations. Since the catalytic activity is determined by the content of catalysts contained in the moist mica paper before drying, the better the solubility of the catalyst, the greater the amount added must be. The wastewater obtained thus comprises a large proportion of the catalyst which does not remain in the mica paper and must be worked up expensively. The known catalysts furthermore have a deficient catalytic activity and the mica insulating materials produced with these have a low mechanical strength and too high an absorption of water and therefore impaired electrical properties.

Formulations based on organic solvents are being replaced more and more by emulsions or dispersions for the processing of silicone resins, for example as binders in paints. Mineral acids, for example, are used as catalysts for curing these resin formulations (EP 98 940). This has the disadvantage that neutralization of the catalyst is additionally necessary. The use of toluene solutions of aluminium (III) or iron(III) acetylacetonates is also described (U.S. Pat. No. 3 395 071, EP 342 519). The disadvantages of these catalysts—chiefly pollution of the environment by solvent vapours—are obvious.

In the formulation of silicone rubbers which crosslink by condensation, the nature of the catalysts used is also decisive for the processing properties and the physical characteristic values of the products. Aqueous formulations in particular have recently found wide interest in silicone rubbers which crosslink by condensation (Liles, D. T.: Polym. Mater. Sci. Eng. 66 (1992) pages 172–173). These usually contain organotin compounds as catalysts (EP 354 015, U.S. Pat. No. 5 145 907) and are often used in the form of emulsions. Because of the surface chemistry of the suitable liquid organotin compounds, emulsifiers are necessary here. Alkylphenol ethoxylates, for example tributylphenol polyglycol ether, are known (DE 42 17 561), but these are toxic.

DESCRIPTION OF THE INVENTION

The object of the invention was to provide a catalyst for the preparation and processing of polyorganosiloxanes, in particular by condensation reactions, which is distinguished in aqueous formulations in particular by an activity which is increased compared with the prior art, improved processability and good environment friendliness.

According to the invention, the catalyst is a silanized organometallic compound. The organometallic compound is preferably a solid or pulverulent, hydrophobic and/or water-insoluble compound of the general formula

$$R^1{}_b MR^2{}_{(w-b)-(z \cdot c)} L_c \qquad (I)$$

wherein $R^1$ denotes identical or different, substituted and/or unsubstituted carboxyl radicals having 1 to 30 carbon atoms and/or identical or different, substituted and/or unsubstituted alkoxy radicals having 1 to 4 carbon atoms and $R^2$ is identical or different, substituted and/or unsubstituted hydrocarbon radicals having 1 to 10 carbon atoms, M is a metal of the 2nd, 3rd or 4th main group or 2nd to 8th sub-group of the Periodic Table, L is identical or different chelating ligands having z bonds to the metal M, w is the coordination number of M, b assumes a value between 1 and w and c assumes values between 0 and 3, and/or partial hydrolysates thereof. Tin, zinc, aluminium, zirconium, iron, titanium or hafnium is preferably employed as the metal M.

Examples of the organometallic compounds employed are aluminium soaps of carboxylic acids having 4 to 18 carbon atoms, such as aluminum hexanoate, aluminum heptanoate, aluminum octanoate, aluminum methyl hexanoate, aluminum nonanoate, aluminum decanoate, aluminum laurate, aluminum myristate, aluminum palmitate, aluminum stearate, aluminum oleate and aluminum ricinoleate, mixtures of these aluminum soaps, mixed aluminum soaps and aluminum soaps which still contain radicals of oxygen, for example as the hydroxyl group, bonded to aluminum. Other examples of organometallic compounds which can be employed are polymeric alkyl titanium esters or chelates, polymeric organozirconium esters or chelates and polymeric organohafnium esters or chelates. These compounds are obtained by partial hydrolysis of, for example, tetramethyl titanate, tetraethyl titanate, tetrapropyl titanate, tetraisopropyl titanate, tetrabutyl titanate, tetraisobutyl titanate, cresyl titanate, octylene glycol titanate, diisobutyl bisacetylacetatotitanate, triethanolamine titanate, diisopropylbisacetylacetatotitanate, titanium chelates which contain citric acid as the chelating ligand, the analogous zirconium or hafnium compounds or mixtures of these compounds. Other examples of organometallic compounds which are used for the preparation of the catalysts according to the invention are metal acetylacetonates, such as aluminum acetylacetonate, iron acetylacetonate, zinc acetylacetonate, calcium acetylacetonate, nickel acetylacetonate, titanium acetylacetonate, zirconium acetylacetonate, and hafnium acetylacetonate. Before the silanization, the organometallic compounds preferably have a particle size of less than 100 µm, particle sizes of less than 10 µm being particularly preferred. The silanizing compound employed is preferably an organosilicon compound of the general formula

$$R^3_a SiX_{(4-a)} \qquad (II)$$

herein $R^3$ denotes identical or different, substituted and/or unsubstituted hydrocarbon radicals having 1 to 10 carbon atoms, with the proviso that at least one radical $R^3$ per compound (II) contains a polar grouping, X is a hydrolysable radical chosen from alkoxy, alkenoxy, acetoxy, amino, amido, aminoxy, oxime and/or halogen groups and a is an integer between 1 and 3, and/or partial hydrolysates thereof.

Polar groupings which are contained in at least one radical $R^3$ are to be understood as meaning all groupings in which an element of higher electronegativity than carbon (for example oxygen, sulphur, nitrogen or phosphorus) is bonded directly to one or more carbon atoms in the radical $R^3$. Examples of such groups are ether groups, polyether groups, ester groups, thioether groups, alcoholic OH groups, mercapto groups, amino groups, amido groups, imido groups, ureido groups and glycosides, as well as heterocyclic radicals containing oxygen, sulphur and/or nitrogen.

Preferably, at least one radical $R^3$ in the compound of the general formula (II) is a grouping with a basic nitrogen. Groupings of the general formula $R^4_2N[YN(R^4)]_nY$, in which $R^4$ denotes identical or different, substituted and/or unsubstituted radicals having 1 to 10 carbon atoms or hydrogen, Y denotes identical or different, substituted and/or unsubstituted divalent hydrocarbon radicals having 2 to 6 carbon atoms and n assumes a value between 1 and 4 and the radical X in the compound of the general formula (II) denotes alkoxy groups are particularly preferred here.

Examples of such compounds are N-methyl-3-aminopropyl-trimethoxysilane, 3-aminopropyl-triethoxysilane, poly-glycol ether-modified aminosilanes, 3-aminopropyl-tris-(2-methoxy-ethoxy)silane, 3-aminopropyl-trimethoxysilane, 3-aminopropyl-methyl-diethoxysilane, amino-functional propyl-methyl-diethoxysilanes, N-aminoethyl-3-amino-propyl-trimethoxysilane, N-aminoethyl-3-aminopropyl-methyl-dimethoxysilane, triamino-functional propyltrimethoxysilane, 3-ureidopropyl-triethoxysilane and 3,4,5-dihydroimidazol-1-yl-propyltriethoxysilane. The catalysts according to the invention are usually obtained by reaction of one or more compounds of the general formula (I) with one or more compounds of the general formula (II) in the presence of water, 0.1 to 5% by weight of water, based on the total amount, preferably being employed. After the reaction has ended, the resulting suspensions are either separated into bed of solids and a liquid, dried and ground, or used as an aqueous paste. The compound (I), the compound (II) and water can be added in any desired sequence in the preparation of the catalysts according to the invention. The compound (I) can be suspended in water and compound (II) can then be added. It is also possible to disperse compound (I) in compound (II) and then to add water. Mixing compound (I) into a mixture of compound (II) and water also gives the catalysts according to the invention.

The particle size of the catalyst particles is 0.1–100 µm, preferably 1–10 µm.

It is possible to mix the catalysts according to the invention together with the fillers into one-component or two-component silicone rubbers which crosslink by condensation or to use them in a combination with known catalysts, for example a paste of dried, pulverulent catalyst according to the invention and a liquid condensation catalyst, such as, for example, dibutyl tin dilaurate.

The catalysts according to the invention are particularly suitable in formulations comprising organosilicon compounds in which water is a constituent of these formulations, where at least one of the catalysts according to the invention is contained at 0.02 to 20% by weight. Advantages arise owing to good processability, high activity and good environmental friendliness (no organic solvents). These aqueous compositions comprising organosilicon compounds comprise, as the organosilicon compound, one or more compounds of the general formula

$$R^5_d(R^6O)_e SiO_{(4-d-e)/2} \qquad (III)$$

wherein $R^5$ denotes identical or different, saturated and/or unsaturated, substituted and/or unsubstituted monovalent hydrocarbon radicals having 1 to 30 carbon atoms, $R^6$ is hydrogen or $C_{1-4}$ alkyl or a mixture thereof, d assumes values between 0 and 2.1 and e assumes values between 0.01 and 4, or mixtures of these compounds with highly disperse silicic acid. Methyl groups are preferred as the radical $R^5$. $R^5$ can, inter alia, also be one of the following radicals: n-alkyl radicals having 2 to 20 carbon atoms, such as, for example, ethyl, hexyl and cyclohexyl; iso-alkyl radicals having 3 to 20 carbon atoms, such as isopropyl and isoamyl radicals; alkyl radicals with tertiary carbon atoms, such as tert-butyl and tert-pentyl; aromatic hydrocarbon radicals, such as phenyl, naphthyl or anthryl radicals; alkylaryl radicals in which the silicon is bonded either to an aromatic carbon, such as, for example, in the case of tolyl radicals, or to an aliphatic carbon, such as, for example, in the case of benzyl radicals; radicals having olefinic double bonds, such as, for example, vinyl, allyl and norbornyl radicals, and substituted hydrocarbon radicals, such as, for example, trifluoropropyl, cyanoethyl, aminopropyl, alkoxyaryl, alkoxyalkyl and haloaryl radicals.

Organosilicon compounds which can be employed are monomeric compounds and linear or branched polymers and oligomers. Examples are silicon resins, which are essentially built up of units of the general formula $R^5SiO_{3/2}$ and have groups which are capable of condensation, such as hydroxyl and alkoxy groups.

As is known, the aqueous compositions comprising organosilicon compounds can comprise, as further constituents, emulsifiers, dispersing agents, fillers (such as chalk, highly disperse silicic acid, benzones and mica), pigments, dyestuffs, thixotropic auxiliaries, thickeners and preservatives. The preparation of emulsions, dispersions and suspensions based on organosilicon compounds is known to the expert.

Emulsions or dispersions of silicone resins which comprise the catalysts according to the invention are employed, inter alia, as binders in paints, such as facade paints, for impregnation of building materials, masonry and fibrous components bound with cement, as a constituent of care agents and for the production of shaped articles from inorganic fibres, such as, for example rockwool and glass silk.

Another example of such formulations are aqueous suspensions comprising silicone resins for production of insulating materials based on mica. During the higher reactivity of the catalysts according to the invention, the amount employed here can be reduced compared with catalysts according to the prior art. This is not only of economic advantage but also helps to ease the load on the wastewater obtained during the production of the mica insulating materials. The water-insolubility of the catalysts according to the invention also proves to be an advantage here.

Crosslinking of silicone resins from which ceramic materials, such as, for example, silicon carbide, are prepared by pyrolysis is also a field of use of the catalysts according to the invention.

If an OH-terminated polydimethylsiloxane (for example prepared by emulsion polymerization) in combination with a silane or siloxane having at leat 3 reactive groups which can be converted into silanol groups and/or highly disperse silicic acid is used as the organosilicon compound, a silicone rubber emulsion is obtained. The catalysts according to the invention are also employed in these products for accelerating crosslinking or curing. The silicone rubber emulsions can be employed, inter alia, as sealing compositions, release coatings or for impregnation of woven fabrics and fibres.

It was completely surprising that the catalytic activity of the organometallic compound was increased to an extreme degree by the silanization.

The catalysts according to the invention can be employed advantageously in all instances where condensation reactions are to be accelerated in the preparation and/or processing of monomeric, oligomeric and/or polymeric organosilicon compounds.

EMBODIMENT EXAMPLES

Example 1

15 g of N-aminoethyl-3-aminopropyl-trimethoxysilane and 40 g of distilled water were added to 45 g of isopropyl methyl titanate polymer (PMTP) and the components were mixed intimately. After standing for more than 24 hours, the resulting paste was employed as a catalyst, together with mica powder, methylsilicone resin powder and water, for production of prepregs in an apparatus for formation of sheets of paper. 5, 10 and 15% by weight of the catalyst, based on the amount of methylsilicone resin, was used. The compression-moulded and cured insulating materials were then tested. Table 1 contains the results of the test for absorption of water after storage at room temperature (RT) for 24 hours.

TABLE 1

| Catalyst addition (%) | Absorption of water without silanization (%) | Absorption of water with silanization (%) |
|---|---|---|
| 5 | 11.6 | 0.2 |
| 10 | 13.5 | 0.1 |
| 15 | 14.8 | 0.3 |

Example 2

50 g of pulverulent aluminium soap were stirred with 500 g of a 10% strength aqueous silane solution (silane analogous to Example 1), and after 1 hour the solid was filtered off and dried at 100° C. for 2 hours. The ground product was employed as a catalyst analogously to Example 1.

The compression-moulded and cured insulating materials were then tested. Table 2 contains the results of the test for absorption of water after storage at RT for 24 hours.

TABLE 2

| Catalyst addition (%) | Absorption of water without silanization (%) | Absorption of water with silanization (%) |
|---|---|---|
| 5 | 6.8 | 0.3 |
| 10 | 4.8 | 0.4 |
| 15 | 4.0 | 0.3 |

Example 3

50 g of pulverulent aluminium soap were mixed with 50 g of silane (analogous to Example 1) at RT. The mixture became warm as a result of the chemical reaction which proceeded. After 24 hours, a rock-hard reaction product was obtained and, after pulverizing, was employed as a catalyst for production of prepregs and insulating sheets analogously to Example 1. 1, 5 and 15% by weight of the catalyst, based on the methylsilicone resin employed, was used.

Table 3 contains the water absorption values of the test sheets.

TABLE 3

| Catalyst addition (%) | Absorption of water without silanization (%) | Absorption of water with silanization (%) |
|---|---|---|
| 1 | 11.9 | 0.7 |
| 5 | 4.8 | 0.1 |
| 15 | 4.0 | 0.05 |

Table 3 clearly shows that if the catalyst according to the invention is used, the amount of catalyst can be reduced to a very great degree.

All the data in Examples 1 to 3 relate to a defined mica quality.

Example 4

100 parts of an anionically stabilized emulsion based on $\alpha,\omega$-dihydroxypolydimethylsiloxane were mixed with 5 parts of a hydrophilic, pyrogenic silicic acid having a BET surface area of 200 g/m$^2$, 2 parts of vinyltriethoxysilane and 2 parts of catalyst from Example 1. The resulting paste forms an elastomer after removal of the water.

We claim:

1. Catalyst particle for the preparation and processing of polyorganosiloxanes by condensation in aqueous formulations, which is a silanized organometallic compound with a particle size of 0.1 to 100 µm.

2. Catalyst according to claim 1, characterized in that the organometallic compound employed is solid or pulverulent.

3. Catalyst according to claim 1, characterized in that the organometallic compound employed is hydrophobic.

4. Catalyst according to claim 1, characterized in that the organometallic compound employed is water-insoluble.

5. Catalyst according to claim 1, characterized in that one or more compounds having the general formula

$$R^1{}_b MR^2{}_{(w-b)-(z-c)} L_c \qquad (I)$$

wherein $R^1$ denotes identical or different, substituted and/or unsubstituted carboxyl radicals having 1 to 30 carbon atoms and/or identical or different, substituted and/or unsubstituted alkoxy radicals having 1 to 4 carbon atoms, and $R^2$ is identical or different, substituted and/or unsubstituted hydrocarbon radicals having 1 to 10 carbon atoms, M is a metal of the 2nd, 3rd or 4th main group or 2nd to 8th sub-group of the Periodic Table, L is identical or different chelating ligands having z bonds to the metal M, w is the coordination number of M, b has a value between 1 and w and c has a value between 0 and 3, and/or partial hydrolyzates thereof, are the organometallic compound.

6. Catalyst according to claim 5, characterized in that M is tin, zinc, aluminum, zirconium, iron, titanium or hafnium.

7. Catalyst according to claim 1, wherein the organometallic compound is an aluminum soap of carboxylic acids having 4 to 8 carbon atoms.

8. Catalyst according to claim 1, wherein the organometallic compound is a polymeric alkyl titanate.

9. Catalyst according to claim 1, characterized in that an organosilicon compound of the general formula

$$R^3{}_a SiX_{(4-a)} \qquad (II)$$

wherein $R^3$ denotes identical or different, substituted and/or unsubstituted hydrocarbon radicals having 1 to 10 carbon atoms, with the proviso that at least one radical $R^3$ per compound (II) contains a polar grouping, X is a hydrolysable radical chosen from alkoxy, alkenoxy, acetoxy, antino, amido, aminoxy, oxime, halogen groups or mixtures thereof, and a is an integer between 1 and 3, and/or partial hydrolysates thereof is a silanizing compound of the organometallic compound.

10. Catalyst according to claim 9, characterized in that, in the general formula (II), at least one radical $R^3$ contains a grouping with a basic nitrogen and the radical X denotes alkoxy groups having 1 to 4 carbon atoms.

11. Catalyst according to claim 1, obtained by reaction of one or more compounds of the general formula (I) with one or more compounds of the general formula (II) in the presence of water,

$$R^1{}_b MR^2{}_{(w-b)-(z \cdot c)} L_c \qquad (I)$$

wherein $R^1$ denotes identical or different, substituted and/or unsubstituted carboxyl radicals having 1 to 30 carbon atoms and/or identical or different, substitute, d and/or unsubstituted alkoxy radicals having 1 to 4 carbon atoms, and $R^2$ is identical or different, substituted and/or unsubstituted hydrocarbon radicals having 1 to 10 carbon atoms, M is a metal of the 2nd, 3rd or 4th main group or 2nd to 8th sub-group of the Periodic Table, L is identical or different chelating ligands having z bonds to the metal M, w is the coordination number of M, b has a value between 1 and w and c has a value between 0 and 3, and/or partial hydrolyzates thereof,

$$R^3{}_a SiX_{(4-a)} \qquad (II)$$

wherein $R^3$ denotes identical or different, substituted and/or unsubstituted hydrocarbon radicals having 1 to 10 carbon atoms, with the proviso that at least one radical $R^3$ per compound (II) contains a polar grouping, X is a hydrolysable radical chosen from alkoxy, alkenoxy, acetoxy, amino, amido, aminoxy, oxime, halogen groups or mixtures thereof, and a is an integer between 1 and 3, and/or partially hydrolysates thereof.

12. Catalyst according to claim 11, characterized in that 0.1 to 50% by weight water, based on the total amount of the compounds, is present.

13. An aqueous composition comprising an organosilicon compound and the catalyst according to claim 1.

14. The aqueous composition according to claim 13, wherein the catalyst is present in an amount of 0.02 to 20% by weight based on the composition.

15. The aqueous composition according to claim 13, comprising as organosilicon compound one or more compounds of the general formula

$$R^5{}_d(R^6 O)_e SiO_{(4-d-e)/2} \qquad (III)$$

wherein $R^5$ denotes identical or different, saturated and/or unsaturated, substituted and/or unsubstituted monovalent hydrocarbon radicals having 1 to 30 carbon atoms, $R^6$ is hydrogen or $C_{1-4}$, alkyl or a mixture thereof, d has a value between 0 to 2.1 and e has a value between 0.01 and 4, or mixtures of these compounds with highly disperse silicic acid.

16. The aqueous composition according to claim 13 further comprising a mica insulating material.

17. Catalyst according to claim 9, characterized in that, in the general formula (II), at least one radical $R^3$ is an $R^4{}_2 N[YN(R^4)]_n Y$ grouping and the radical X is an alkoxy radical, wherein $R^4$ denotes identical or different, substituted and/or unsubstituted radicals having 1 to 10 carbon atoms or hydrogen, Y denotes identical or different, substituted and/or unsubstituted divalent hydrocarbon radicals having 2 to 6 carbon atoms and n has a value between 1 and 4.

* * * * *

UNITED STATES PATENT AND TRADEMARK OFFICE
CERTIFICATE OF CORRECTION

PATENT NO. : 5,708,113
DATED: : January 13, 1998
INVENTOR(S) : GÜNTER BEUSCHEL, ET AL It is certified that error appears in the above-identified patent and that said Letters patent is hereby corrected as shown below:

Column 3, line 14, "$R^3_aSiX_{(4-a)}$" should read --$R^3_aSiX_{(4-a)}$--;
  line 15, "herein $R^3$" should read --wherein $R^3$--.

Column 4, line 9, "dibutyl tin dilaurate" should read --dibutyl-tin dilaurate--.

Column 5, line 15, "at leat 3" should read -- at least 3--.

Column 7, line 24, "antino" should read --amino--;
  line 42, "substitute, d and/or" should read --substituted and/or--.

Signed and Sealed this

Seventeenth Day of November, 1998

*Attest:*

BRUCE LEHMAN

*Attesting Officer*   *Commissioner of Patents and Trademarks*